United States Patent [19]

Williams et al.

[11] 4,014,018
[45] Mar. 22, 1977

[54] PULSE RADAR APPARATUS

[75] Inventors: Philip David Lane Williams, Banstead; Harry Donald Cramp, New Malden, both of England

[73] Assignee: Decca Limited, London, England

[22] Filed: July 16, 1975

[21] Appl. No.: 596,454

[30] Foreign Application Priority Data

Aug. 6, 1974   United Kingdom ............. 34522/74

[52] U.S. Cl. ............................. 343/5 VQ; 343/7 A
[51] Int. Cl.² ........................................ G01S 7/44
[58] Field of Search ............. 343/5 DP, 5 VQ, 7 A, 343/17.1 R

[56] References Cited
UNITED STATES PATENTS

| | | | |
|---|---|---|---|
| 3,168,732 | 2/1965 | Bretscher | 343/7 A X |
| 3,349,395 | 10/1967 | Carre et al. | 343/17.1 R |
| 3,353,177 | 11/1967 | Wilmot | 343/5 VQ |
| 3,430,235 | 2/1969 | Bender et al. | 343/7 A |
| 3,441,932 | 4/1969 | Hamill et al. | 343/5 DP X |
| 3,710,384 | 1/1973 | Ashcraft | 343/7 A |

Primary Examiner—T.H. Tubbesing
Attorney, Agent, or Firm—Edward F. Connors

[57] ABSTRACT

A receiver for a pulse radar apparatus has a pulse length discriminator in which the amplitude of the received radar signals after detection is sampled at a rate such that there would be a plurality of samples, e.g. 4 to 12 samples in the time duration corresponding to the transmitted pulse length. Processing means are provided giving an output only when the number of successive samples having a predetermined amplitude lies between predetermined limits, e.g. not less than 4 and not greater than 8.

15 Claims, 1 Drawing Figure

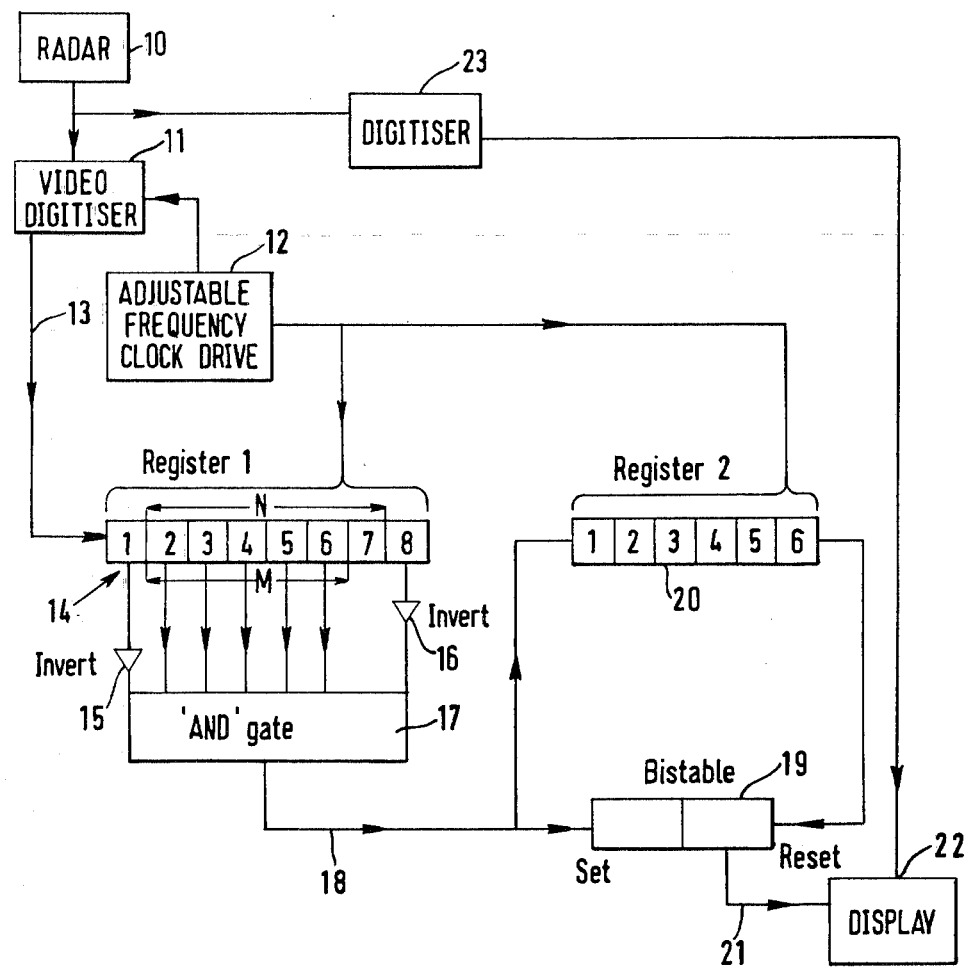

PULSE RADAR APPARATUS

BACKGROUND OF THE INVENTION

1. Field of the Invention

This invention relates to pulse radar apparatus and to receivers therefor and is concerned more particularly with radar apparatus for the detection of surface targets, for example, marine radar apparatus.

2. Prior Art

It is known to use pulse length discrimination as an anti-clutter and anti-interference circuit in receivers of pulse radar equipment. Pulse length discriminators for example are described in:

Nathanson, F. E. Radar Design Principles — Signal Processing and the Environment, McGraw-Hill, 1969, pages 112–119;

Lawson, J. L. and G. E. Uhlenbeck, Threshold Signals — MIT Radiation Laboratory Series No. 24. McGraw-Hill 1950; and Hansen, V. G. Studies of Logarithmic Radar Receivers Using Pulse-length Discrimination. IEEE Trans. Vol. AES-1, No. 3. December 1965.

Such pulse length discriminators are analogue devices and, because they are amplitude conscious, to use such devices with any degree of success in practice, some form of limiting of the IF or video amplitude is necessary. It is therefore an established technique to use low gain IF amplifiers with as good as dynamic range as possible followed by logarithmic video amplifiers or, better still, to use one of the forms of logarithmic IF amplifiers followed by a video high pass filter, that is to say, a fast time constant circuit. This combination, in a microwave radar receiver, of a mixer/local oscillator followed by a preamplifier in a narrow band IF filter and then a wide band logarithmic IF amplifier strip with built-in video detectors driving a fast time constant circuit gives a good constant false alarm rate (CFAR) characteristic in Rayleigh distributed clutter from sea or rain or from chaff in a hostile environment. Under these conditions, if a fast time constant circuit is replaced by a pulse length discriminator matched to the pulse length, a degree of receiver selectivity takes place, not only in the frequency domain due to the post preamplifier narrow band filter, but also in the rejection of interfering pulses which are either longer or shorter than the transmitter pulse length.

Unfortunately echoes from range-extensive targets are rejected by the pulse length discriminator as these result in the received signals being longer than those transmitted. On a marine radar, the range resolving power of even a modest resolution radar (for example one having a transmitted pulse length of 0.1 microseconds) is of the order of 15 meters. Many ships exceed this length and hence a pulse length discriminator as described above would reject responses from most ships. For this reason, pulse length discriminators have been used mostly in ground-to-air or air-to-air radars which use a longer pulse length than marine radars, typically one microsecond. A one microsecond pulse is equivalent to 150 meters range resolution and hence there is negligible lengthening of received pulses from aircraft targets. However there is a growing need in marine radars to be able to detect small craft, for example when searching for small patrol craft. Pulse length discrimination can help in the detection of small targets but, with marine radars, a further pulse distortion mechanism has to be taken into account. The radar signal reflected directly from a target which is received by a ship-borne radar is contaminated by the indirect signals due to sea reflection. Measurement has shown that, even with a one-way beacon transmitting system, the transmission of a pulse of 0.5 microseconds can be distorted to produce a pulse varying from 0.5 to 0.8 microseconds. There is evidence moreover in some cases of a reduction in duration due to the sea reflected signal so that the original 0.5 microsecond pulse is reduced to considerably less than that time period. For this reason, a pulse length discriminator operating on a sea-borne radar with high discrimination of unwanted pulse lengths would be accompanied by a serious loss of wanted targets. This is due, firstly, to many of the targets of interest having a size exceeding the range resolution of the radar set, particularly bearing in mind that pulse lengths as short as 0.05 microseconds are now commonly in use. Secondly, point targets will return a generally lengthened but possibly shortened pulse due to the above described sea reflection and multipath phenomena. For these reasons, the use of pulse length discrimination for clutter and interference rejection in marine radars has heretofore been strictly limited; it has generally been considered preferable to use other forms of discrimination, for example integration at the pulse recurrence frequency, for clutter and interference rejection.

SUMMARY OF THE INVENTION

The present invention is directed to providing an improved form of pulse length discriminator particularly suitable for the detection of small targets in marine radar apparatus. As will be explained later, this form of pulse length discriminator may be used to display small targets distinctively on a display which also displays large targets.

According to the present invention in a receiver for pulse radar apparatus, there are provided means for sampling the amplitude of the received radar signals at a rate such that there would be a plurality of samples in the time duration corresponding to the transmitted pulse length, and means giving an output only when there are at least M successive samples of at least a predetermined amplitude in N successive samples, when N is greater than M. Preferably the sampling rate is at least four times (and typically might be eight times) the reciprocal of the duration of the transmitted pulse. Thus any radar return signal would have at least four successive samples of above a predetermined amplitude; the value of M in this case might be made 4. The value of N is chosen to reject long duration signals and would be slightly above M, say 5 or 6 if M is 4. Thus an output is obtained only if the returned signal has a pulse length equal to or slightly longer than the duration of the transmitted pulse. The values of M and N may be chosen as required to effect any desired pulse length discrimination. In particular M may be chosen to be an integer not less than 4 and not greater than 8. Conveniently N-M is equal to 1 or 2 although in some cases it could be a larger number.

Considered from another aspect, the invention includes within its scope a receiver for pulse radar apparatus wherein there are provided means for digitizing received radar signals at a clock pulse rate faster than the reciprocal of the duration of the transmitted pulse and means for giving an output only when there are at least M successive and not more than N successive signals representing a received digitized target return, N being greater than M. Typically M is the number of inputs which occur during the time duration corresponding to the transmitted pulse length and N is a slightly greater number. The clock pulse rate, as previously indicated is preferably chosen so that M is at least 4 and typically might be 8.

It will be seen that, if M and N are fixed then the clock pulse rate will determine the centre point of the pulse duration selected by the disriminator. The tolerance of pulse length depends on the difference between N and M.

The above described arrangement thus constitutes a pulse length discriminator. With this form of discriminator, an output is obtained only if the received signal has a pulse duration corresponding to at least M clock pulse units but less than N clock pulse units. To consider a specific example, suppose that the transmitted pulse length is 0.5 microseconds and that it is required to detect pulses having a pulse length centred on 0.5 microseconds but extending above and below this. In such a case M might be made equal to 5 and N equal to 6. If the clock pulse frequency is $f$, then $(M+N)/2f$ has to be 0.5 microseconds. Since $M + N = 11$ the clock pulse frequency is 11 MHz. The tolerance of the pulse length discriminator is $\pm(N - M)/2f$, which, for the above example, is $\pm 0.045$ microseconds.

Using digital techniques it is readily possible to adjust M and N as required and to adjust the clock pulse rate. Hence it is possible to provide adjustable pulse length discrimination with adjustment of the tolerance of pulse lengths to be accepted. It is convenient often to make use of two variables namely the clock frequency (which, for any given values of M and N, controls the centre point of the range of pulse lengths) and the excess number of units, that is N - M, (which, for a given clock frequency, determines the tolerance of pulse length.

In one form of apparatus, there is provided a register having a number of cells at least two greater than the maximum required number for N, means for feeding the digitized radar information at the clock frequency in real time into this register and output means operative to give an output only when there are not less than M and not more than N successive bits indicating a target signal in the register. The register may be a shift register into which the sampled signals are fed in succession and the output means may be operative only when the excess bits above the N bits of the register indicate no signal input, the excess bits being at least one at each end of the register, and when additionally there are at least M successive target indicating bits in the selected N bits of the register. For this purpose, inverters may be provided for inverting the signals in the excess bits beyond N at the two ends of the register and the outputs from these inverters together with the outputs from M successive bits in the register may be fed to an AND gate to provide the required output signal.

This output signal may be converted by a pulse lengthener to a signal of suitable duration for a cathode ray tube display. Conveniently the pulse lengthener comprises a bistable to which said output signal is fed and which is arranged to control feeding of clock pulses into an auxiliary register constituting a counter to reform, from each output pulse, a pulse of a required duration for a display output. The output passing the AND gate may set the bistable and initiate the counting into the auxiliary register which auxiliary register, when full, resets the bistable to terminate the reformed pulse.

The use of a pulse length discriminator as described above allows a radar display to be made sensitive to a wide range of input pulse lengths by adjustment of the frequency of the clock generator. It is possible to explore echoes from targets of the original pulse length with varying degrees of pulse stretching or pulse narrowing as required.

Conveniently the output signals from the pulse length discriminator, preferably after pulse lengthening as described above, are applied as a brightness modulation to a cathode ray tube radar display so as to give a brighter modulation than other signals obtained from the radar. The signals from the pulse length discriminator might be superimposed upon a conventional radar display but most conveniently, the display is modulated at any one of two or three brightness levels, for example as described in the specification of co-pending U.S. application Ser. No. 573090 the output from the pulse discriminator being used to give the maximum brightness modulation and other radar data being applied to give a lower level of brightness modulation. As described in the aforementioned specification, the amplitude of the received and rectified signals from the radar receiver may be repetitively sampled and quantized in at least three amplitude levels and then encoded to give additionally encoded indication of the amplitude level. Conveniently a four level quantizing system is employed, one of the levels being zero. All the radar information may be displayed in this way with the output of the pulse length discriminator superimposed at an even brighter level to give emphasis in the display to targets providing signals of the selected pulse duration.

It is thus possible to leave small point targets giving a minimum of pulse distortion to paint on the display at maximum display brilliance and to subordinate the extended coast lines or large easily detected ships and various types of clutter to be shown at lower levels where their presence is not so distracting but where their complete absence might mislead the observer.

Preferably in the radar apparatus using the above described digital pulse length discriminator, there is also used pulse-to-pulse integration to reject noncoherent pulse interference or jamming. The combined rejection on the accumulative criteria of pulse recurrence frequency matching and pulse length indentification gives efficient rejection of interference. This is further enhanced if pulse recurrence frequency jitter is employed and even more so if pulse length changing as well as pulse recurrence frequency or pulse recurrence interval changing is used. The transmission sequence can be controlled from a random look up table or similar stochastic method thereby making the receiver not capable of easy jamming. Under such conditions a logarithmic receiver, with correct choice of bandwith at the appropriate point in the logarithmic receiver, is capable of very good CFAR action.

BRIEF DESCRIPTION OF THE DRAWING

The accompanying drawing illustrating one embodiment of the invention shows one form of digital pulse length discriminator in a radar receiver.

DESCRIPTION OF THE PREFERRED EMBODIMENT

Incoming radar signals from pulse radar apparatus 10, after processing in the conventional way, for example with bottom clipping and swept gain clutter control, are fed as a video frequency signal to a video digitizer 11 where the signals are digitized at a clock pulse rate derived from an adjustable frequency clock drive 12. This clock drive has a frequency which is set to a value several times the reciprocal of the transmitted pulse length. It may, as in the specific figures quoted above, be 5½ times the reciprocal of the mean pulse length. The clock drive frequency is adjustable for the reasons described above. The digitized radar information is fed on lead 13 into a register 14, typically a shift register. It is required to check the presence of M successive bits of information in N bits with absence of signal before and after the N bits. In the particular example illustrated M can be any number between 1 and 6 and N can be any number between M and 7. The figure shows the conditions where M is 5 and N is 6. To check that there are not more than 6 successive bits indicating target returns, the test applied is to determine that the first and eighth cells in the register 14 are empty. For this purpose inverters 15 and 16 are provided which will give outputs only when the first and eighth bits of the register are empty. To check that there are M (in this case 5) successive bits showing a target return, M successive cells, i.e. cells 2 to 6 in the register have their outputs connected to an AND gate 17 to which are also connected the outputs of the inverters 15, 16. It will be seen that this AND gate 17 will only give output on its output line 18 provided the first and eighth bits of the register are empty and provided there are M successive information bits in the register. In other words the AND gate 17 gives an output on the conditions that the incoming signal is not longer than the duration of N clock pulses and is at least as long as the duration of M clock pulses. It will be readily apparent that, by appropriate connections between the register 14 and the AND gate 17, it is readily possible to select the values of M and N. Provision may be made for switchably selecting required values.

The output signal on line 18 is fed to a pulse lengthener comprising a bistable 19 and an auxiliary register 20. The signal on line 18 is fed to the set input of the bistable 19 and is also arranged to start counting in the auxiliary register 20 which counts clock pulses from the clock 12. In this particular case register 20 counts six successive clock pulses and, when it is full, resets the bistable 19. The bistable thus provides an output signal on a line 21 only after a signal has been produced on line 18, the output signal on line 21 having a duration determined by the count in the auxiliary register 20. This signal typically is a pulse of a duration substantially the same as the radar transmitted pulse and it may be displayed on a radar display 22, for example a cathode ray tube plan position display, in the conventional manner. Preferably it is applied as a pulse of maximum amplitude to give maximum brightness on a cathode ray tube display which also displays other radar information at a lower level of brightness. This other radar information may be analogue video signals but preferably is digitized video information from the receiver 10 via a digitizer 23. This digitized video is fed to the display 22 at a predetermined amplitude level less than that for the output from the pulse length discriminator 11 to 21. The digitizer 23 may be of the kind described in the aforementioned co-pending application Ser. No. 573090.

The output from the pulse length discriminator 11 to 21 may be processed in a pulse-to-pulse integrator (not shown) to reject noncoherent pulse interference. The radar pulse length may be changed in a random or other sequence and the pulse length discriminator switched in the appropriate sequence to give further protection against jamming. Such further precautions together possibly with pulse recurrence frequency jitter or pulse recurrence interval changing will give even further protection against interference.

The clock pulse rate from clock drive 12 determines the sampling frequency in the radar pulse. The range of frequencies which can be employed in any given radar will depend on a number of parameters. The lower limit is determined essentially by the minimum pulse duration. The sampling frequency for sampling a unipolar pulse must be at a rate greater than the reciprocal of the minimum pulse duration to be sampled. The maximum sampling frequency for short duration radar pulses (e.g. 0.05 microseconds) will commonly be set by the hardware availability and expense of multi-phase clocking. Also, in practice, pulse distortion problems can arise if the sampling pulses are very short because of the bandwidth required. For longer duration transmitted pulses, say 10 microseconds, the frequencies required are well within hardware capabilities and the upper limit to the sampling frequency is likely to be set by the pulse distortions.

A further consideration affecting the sample frequency is that, for radar returns with a small signal-to-noise ratio, the pulse width is determined by the presence or absence of noise spikes contiguous to the pulse. Thus, for these small signal-to-noise ratio returns, there is little point in sampling at more than twice the video frequency or comparable IF bandwidth through which the pulse is amplified.

In the specific embodiment illustrated in the drawing, only one pulse length discriminator 11 to 21 is shown. It is possible however to have more than one pulse length discriminator, set to different pulse lengths or to different tolerances. The information from the separate pulse length discriminators may be distinctively displayed on a single display or on more than one display.

Distinctive display of information may be obtained on a cathode ray tube by the use of different brightness levels or by using different amounts of pulse stretching. Using a colour tube, information may be displayed distinctively using different colours or colour combinations. For example, if three pulse length discriminators are used centred on the same pulse length but with different tolerances, their outputs may be applied as drives for three different colours; the signals within the tightest tolerance will come within the wider tolerances and will drive all three colours to produce white whereas other signals, not within the tightest tolerance, will only give a single colour or a combination of two colours. The different pulse length discriminators in such a case may be responsive to signals of differing amplitude levels.

A display using a single pulse length discriminator may be arranged also to display information combined in a distinctive manner with other information, e.g. information possibly sorted using some criteria other than pulse length.

Although a display using a cathode ray display tube has been described, other types of visual display devices, for example using a plasma panel or light-emitting diodes may be employed or the information may be further processed, e.g. in a computer before ultimate utilisation.

We claim:

1. In a receiver for pulse radar apparatus utilising transmitted pulses of a predetermined duration and providing received radar signals; the provision of means for sampling the amplitude of the received radar signals at a rate such that there would be a plurality of samples in the time duration corresponding to the transmitted pulse length, and means giving an output only when there are at least M successive samples of at least a predetermined amplitude in N successive samples, when N is greater than M.

2. Pulse radar apparatus as claimed in claim 1 wherein the sampling rate is at least four times the reciprocal of the duration of the transmitted pulse.

3. Pulse radar apparatus as claimed in claim 1 wherein M is an integer not less than 4 and not greater than 8.

4. Pulse radar apparatus as claimed in claim 3 wherein N-M is 1 or 2.

5. A receiver for pulse radar apparatus utilising transmitted pulses of a predetermined duration and providing received radar signals wherein there are provided a clock providing clock pulses at a clock pulse rate faster than the reciprocal of the duration of the transmitted pulse, means controlled by said clock for digitizing the received radar signals at said clock pulse rate and means responsive to the digitized radar signals arranged to give an output only when, during a period of a predetermined number of clock pulses, there are at least M successive and not more than N successive signals representing a received digitized target return, N being greater than M.

6. A receiver as claimed in claim 5 wherein M is the number of inputs which occur during the time duration corresponding to the transmitted pulse length and N is a slightly greater number.

7. A receiver as claimed in claim 5 where M is an integer not less than 4 and not greater than 8 and where N-M is 1 or 2.

8. A receiver as claimed in claim 5 wherein said clock comprises an adjustable frequency clock.

9. A receiver as claimed in claim 5 wherein there are provided a register having a number of cells at least two greater than the maximum required number for N, means for feeding the digitized radar information at the clock frequency in real time into this register and output means operative to give an output signal only when there are not less than M and not more than N successive bits indicating a target signal in the register.

10. A receiver as claimed in claim 9 wherein the register is a shift register into which the sampled signals are fed in succession and the output means are operative only when the excess bits above the N bits of the register indicate no signal input, the excess bits being at least one at each end of the register, and when additionally there are at least M successive target indicating bits in the selected N bits of the register.

11. A receiver as claimed in claim 10 wherein inverters are provided for inverting the signals in the excess bits beyond N at the ends of the register and wherein means are provided for feeding outputs from these inverters together with the outputs from M successive bits in the register to an AND gate to provide the required output signal.

12. A receiver as claimed in claim 9 wherein a pulse lengthener is provided for converting the output signal to a signal of suitable duration for a cathode ray tube display.

13. A receiver as claimed in claim 12 wherein said pulse lengthener comprises an auxiliary register constituting a counter, means feeding clock pulses from said clock to said auxiliary register, a bistable having a set and reset inputs, means applying each said output signal to the set input of the bistable and also to said auxiliary register to initiate counting of clock pulses, and means connecting said auxiliary register to said reset input to feed a signal thereto when a predetermined number of clock pulses has been counted in said auxiliary register, whereby said bistable is set for a predetermined duration after each output signal thereby forming a pulse lengthener.

14. A receiver as claimed in claim 13 wherein the bistable is arranged to be set by the output signal passing the AND gate and reset by a register full signal from said auxiliary register.

15. A receiver as claimed in claim 12 and having a cathode ray display tube to which received radar signals after detection are applied as a brightness modulation wherein the output signals from said pulse lengthener are applied to said cathode ray tube as a brightness modulation so as to give a brighter modulation than the applied detected radar signals.

* * * * *